2,826,489

METHOD FOR THE MANUFACTURE OF GAS-PURE METALS AND ALLOYS

Anton Robert Wagner, Trollhattan, Sweden, assignor to Nyby Bruks AB, Nybybruk, Sweden, a company of Sweden No Drawing. Application December 16, 1954
Serial No. 475,813

Claims priority, application Sweden December 18, 1953

4 Claims. (Cl. 75—59)

In modern metallurgy, as is well known, certain attempts have been made to produce metals and alloys which are as pure as possible with respect to the gases that are dissolved in the metals. On account of the solubility of gas being considerably greater in a melt than in a solid body, it is necessary to operate with melts when removing the dissolved gases. It has been shown, that a high degree of purity, that is, a low percentage of gases in a metal or an alloy, is necessary for the metal or alloy to obtain its best qualities. To solve the problem of removing gases from metal charges several methods have so far been proposed, which methods may be separated into two principal groups, namely chemical binding of the gases in solid form, for instance in a slag, or mechanical evacuation of the gases. A third method, which approaches the function of the mechanical evacuation, is washing-out the dissolved gases by blowing another gas through the melted charge and which gas may be called washing-gas.

If the chemical binding of the gases in slag is used, it will become necessary to use a repeated treatment with fresh slag, in order to obtain an effective washing, because an equilibrium between the percentage of gas in the slag and in the melt always takes place. Further the difficulty exists of preventing the renewed entry of, for instance oxygen and nitrogen from the air when slag is being drawn and when the melt is being tapped. Corresponding difficulties take place when the melt is being washed with a gas, which always will result in a certain partial pressure of the washed-out gas above the melt, with accompanying rediffusion, and also in this case during the tapping of the melt, the same difficulties will result, although to a still higher degree, as mentioned above, as a negative pressure of oxygen, nitrogen and hydrogen has resulted against the surrounding atmosphere. This has as a consequence, not only a renewed dissolution of these not desired gases, but at the same time a powerful chemical reaction between the gases and the greatly enlarged surface part of the melt will take place at the tapping. These hereby created compounds, will appear as thin films, which at the hardening of the melt form disjointing layers in the structure of the metal and thereby destroy the strength qualities. The mechanical evacuation of the gases has the advantage, when compared with the other methods, that also the tapping is done under vacuum, so that rediffusion is avoided. However, even the method of mechanical evacuation involves considerable difficulties, the most striking, at first sight, being the very complicated and expensive installations required for the evacuation, and the necessity of having to treat the melt in a gas tight chamber. This way among other things, causes a great deal of special difficulties, if the work is not done in a very small scale. With this method of evacuation, there is still another factor to contend with, which so far has not been considered. This factor comprises the fundamental displacing of the critical values of the melt, above all the melting point and the point of the volatilization. At very low pressure, the metals that comprise the melting charge will vaporize to a higher extent, than is the case at higher pressure. This volatilization will occur in a certain proportion to the natural vaporizing point of components contained in the melt and must therefore cause a change in the composition. Another difficulty is this, that the metal vapors that are present in the melting charge in form of bubbles will, at the hardening of the melt in vacuum, condense, whereby are created fine cavities, that is to say the material mass will be discontinuous with lessened cohesion and lessened strentgh as a consequence. Such cavities may in effect be compared to cracks.

This present invention concerns a new way of gas-cleaning of metal melts and preventing of unsuitable gas collection, through which the above named difficulties can be entirely eliminated. The invention is based on the fundamental thought, that another gas than those that are dissolved in the melting charge can perform as vacuum in comparison to the dissolved gases. This will in the following be called "evacuation," in opposition to the "mechanical evacuation" hitherto used.

The method, according to the invention is principally characterized in the gas containing melt being brought in contact only with atmosphere that is free from the kind of gases it is desired to remove from the melting charge and is relatively insoluble therein. If it is desired to keep the percentage of nitrogen in a steel melting charge, the evacuation, according to the invention, may be accomplished by bringing the melt in contact with an oxygen free atmosphere with a certain percentage of nitrogen, in which the partial pressure of the nitrogen will be in approximate equilibrium with the desired percentage of nitrogen in the steel melt. The balance of the gas atmosphere may consist of another gas, which is permitted in the melt or eventually a neutral gas, for instance a rare gas such as helium, argon, krypton, etc., which gases do not dissolve in metal melts. On the other hand, if it is desired to remove or lessen the percentage of all the gases that are contained in the melt, this can be accomplished by evacuation with solely neutral or inert gases such as rare gases.

The new method is particularly suitable for melts, containing strongly nitride forming metals such as titanium, niobium, tantalum and vanadium. Alloys containing such metals should, according to the invention not only be melted, but should be tapped and hardened in an atmosphere free from nitrogen, thus suitably with the usage of an inert gas, for instance argon or helium or eventually hydrogen.

At the carrying out of the evacuation, it is important not only to supply the washing gas, but also to remove same together with washed-out gases, because otherwise it would merely be possible to reach such a position of equilibrium, that the washed-out gases in the furnace atmosphere would be in equilibrium with the remaining gases in the melt. The supplying of washing gas should occur as close to the surface of the melt as possible, because naturally it is the equilibrium in the boundary layer between gas and melt, that must be disturbed if complete out-washing will take place. Even if the known method is used, to blow a washing gas through a melt or creating a washing gas within the melting charge itself, it is thus possible to obtain a considerable improvement through the application of the invention, that is supplying a washing gas over the surface of the melting charge, in order to make the reaction between the melting charge and the gas non-reversible, and tapping in an atmosphere of the washing gas.

The invention is usable, not only for such steel alloys and other alloys, which are used for different construction purposes, but naturally to the highest degree even with the production of different additional or alloy metals, for instance ferro alloys, which are used in the production of various construction materials.

Among the ferro alloys, ferro titanium is of particular interest in this connection. It is known that a considerable quantity of the ferro titanium on the market today, is of a very inhomogeneous composition, and in reality consists of mixtures of various types of ferro titanium. Even by visual observation, three principal parts may be distinguished, which parts on account of their color may be called blue, yellow and white ferro titanium. A ferro titanium bought in the market with a percentage of 31.5% titanium according to certificate and analysis, and a percentage of silicon of 3.1% was divided into yellow, blue and white pieces. At the analysis of these, one by one, it was shown, that the white one contained 28.8% titanium and 5.4% silicon, the yellow one 60.4% titanium and 0.8% silicon and the blue one 56.1% titanium and 0.9% silicon.

A melting test showed further, that the white ferro titanium was completely dissolved in a steel melt at 1550° C., while neither the yellow nor the blue one was dissolved, even if the temperature was kept at 1750° C. for two hours. This condition not only causes the difficulty, that the produced alloy when using such ferro titanium, must as a result contain a great many inclusions of not dissolved ferro titanium, which would destroy the qualities of the material, but besides it would be kept in this way impossible to calculate beforehand the necessary supply of ferro titanium for the desired percentage of titanium and silicon, whereby at the same time a reproduction of an analysis would be impossible.

By the application of the invention during the production of ferro titanium, that is melting, tapping and hardening under evacuation with neutral gas such as inert gas or eventually hydrogen, it is possible to produce a uniform ferro titanium of the white dissolvable type, and also to calculate beforehand the charging of materials. This assumes, however, that also the alloying of a melt, with the help of such ferro titanium must be carried out with the usage of evacuation, because at the temperature of the melt in the presence of even small quantities of air, the white titanium may change into the yellow or the blue modification.

The method according to the invention, may be easily accomplished in any kind of furnaces, ladles or molds available. If these are not closed, it is suitable to place a cover or a casing over them, which only necessitates covering to such a degree, that it would be possible to maintain a slight overpressure of the washing gas in the furnace chamber without creating uneconomical losses of gas. The leakage that prevails would then serve to remove the washing gas. Also the tapping spout should of course be protected.

What is claimed is:

1. A method of removing dissolved gas from a metal melt which comprises passing another gas which is relatively insoluble in the metal melt over the immediate surface of the melt to remove the boundary layer between the gas atmosphere above the metal melt and the surface thereof and then cooling and solidifying said metal in an atmosphere of said washing gas.

2. Method as defined in claim 1 in which the washing gas contains an element to be alloyed with said metal.

3. Method as defined in claim 1 in which the washing gas consists of a rare gas.

4. Method as defined in claim 1 in which the metal contains dissolved nitrogen and the washing gas contains nitrogen.

References Cited in the file of this patent

UNITED STATES PATENTS

| 1,810,801 | Todt | June 16, 1931 |
| 1,847,555 | Frary | Mar. 11, 1932 |

OTHER REFERENCES

Metal Progress, December 1948, pages 833 to 836.
Manufacture of Titanium Alloys, page 1, P. B. Report 107, 150. P. R. Mallory Co., Inc. Released September 12, 1952.